United States Patent [19]

Upchurch

[11] Patent Number: 4,528,301

[45] Date of Patent: Jul. 9, 1985

[54] OXYGEN PERMEABLE, STYRENE BASED, CONTACT LENS MATERIAL

[75] Inventor: Billy T. Upchurch, Norfolk, Va.

[73] Assignee: GBF, Inc., Virginia Beach, Va.

[21] Appl. No.: 506,975

[22] Filed: Jun. 23, 1983

[51] Int. Cl.$^3$ ............ C08J 3/28; C08L 31/08; C08L 53/00; C08L 83/00

[52] U.S. Cl. ............ 523/107; 204/159.22; 525/100; 526/279; 528/26

[58] Field of Search ............ 204/159.22; 523/106, 523/107; 526/279; 528/26; 525/100

[56] References Cited

U.S. PATENT DOCUMENTS

| | | |
|---|---|---|
| 3,197,432 | 7/1965 | Lamoreaux . |
| 3,808,179 | 4/1974 | Gaylord . |
| 3,983,083 | 9/1976 | Kaetsu et al. . |
| 4,182,723 | 1/1980 | Covington ............ 523/107 |
| 4,228,269 | 10/1980 | Loshack et al. . |
| 4,243,790 | 1/1981 | Foley . |
| 4,245,069 | 1/1981 | Covington . |
| 4,303,772 | 12/1981 | Novicky . |
| 4,327,202 | 4/1982 | Foley . |
| 4,327,203 | 4/1982 | Deichert et al. ............ 523/107 |
| 4,393,184 | 7/1983 | Tarumi et al. ............ 204/159.22 |
| 4,400,333 | 8/1983 | Neefe ............ 523/107 |
| 4,413,104 | 11/1983 | Deubzer et al. ............ 523/107 |
| 4,419,505 | 12/1983 | Ratkowski et al. ............ 503/107 |
| 4,433,125 | 2/1984 | Ichinobe et al. ............ 523/107 |

OTHER PUBLICATIONS

Article entitled "Assessing the Wesley-Jessen Airlens" by Josephson, Caffery and Pope; Jun., 1983 edition of *Contact Lens Forum*, at pp. 55 through 62.

*Primary Examiner*—Allan Lieberman
*Attorney, Agent, or Firm*—Bacon & Thomas

[57] ABSTRACT

A new contact lens material that is gas permeable, surface wettable, and relatively hard is disclosed. Also disclosed are contact lenses made of this new material, which are comfortable to wear. The new contact lens material is the copolymerization product of a reaction mixture comprising: (1) styrene or a ring substituted styrene; (2) a vinyl alcohol ester such as vinyl acetate; (3) a polyethylene glycol ester such a pentaethyleneglycol monomethacrylate; (4) a substituted polysiloxane such as dimethyl polysiloxane or a substituted silane; and, optionally, (5) a cross-linking agent such as divinyl benzene.

19 Claims, No Drawings

OXYGEN PERMEABLE, STYRENE BASED, CONTACT LENS MATERIAL

BACKGROUND OF INVENTION

1. Field of Invention

This invention relates to the field of polymeric materials suitable for use in forming contact lenses. More particularly, it relates to a polymeric material that is relatively rigid (a "hard" lens material), has increased gas permeability, has enhanced surface wettability, and is comfortable to wear. 2. Description of the Prior Art In recent years, corneal contact lenses have become more and more popular in the United States and throughout the world.

The great popularity of contact lenses is easily understood. One important reason is that such lenses provide perhaps the best possible manner of achieving optical correction for the eyes. The lenses fit directly over the eye, and when properly fitted, are easily retained in place. Problems common with spectacles, such as interference with peripheral vision, moving about on the head, discomfort, and the possibility of improper interpupilary distance, are easily overcome. Contact lenses provide cosmetic advantages and afford convenience and increased safety when used in diverse pursuits, particularly sporting events.

Contact lenses, which were originally made from glass, were gradually improved as improved lens materials became available. Now most commonly used contact lenses are generally subdivided into two types, so-called "hard" contact lenses, and "soft" contact lenses. Each type of lens has its own advantages, but each also includes certain disadvantages.

Referring first to the advantages of "hard" contact lenses, these lenses provide dimensional stability, so that the characteristics of an optical prescription will remain unchanged while the lens is in use in the eye. In some cases, the eye will actually conform to the contour of the lens over a period of time so as to improve the vision of the wearer. Moreover, "hard" contact lenses are relatively durable in relation to "soft" lenses.

While "hard" contact lenses have the above and other advantages, some patients find such lenses somewhat uncomfortable in use, and prefer the so-called "soft" contact lens. These lenses fall generally into three categories, namely (1) lenses made from silicone rubber or like materials, (2) lenses made from "HEMA" (hydroxyethylmethacrylate) or so-called "hydrogel" lenses, and (3) lenses of the methyl methacrylate base type, modified by the addition of polymers such as cellulose acetate butyrate ("CAB"). "Soft" lenses readily conform to the eye and are quite comfortable in short term use. They are extremely thin as well as soft and pliable. However, "soft" lenses are not as durable as "hard" lens and generally require greater care.

One of the major disadvantages to most prior art contact lens materials is the fact that they are not gas permeable.

"Hard" lenses of polymethylmethacrylate (PMMA) resins have long been used for the manufacture of contact lenses because of their excellent optical properties and machining and molding characteristics. A major disadvantage of PMMA resins is their very low permeability to gases such as oxygen present in the air and carbon dioxide that is a metabolic waste product produced by the eye. Since the cornea needs a continuous supply of oxygen from the air to provide for ongoing metabolic processes, the low gas permeability of the PMMA resins has necessitated lens designs which ameliorate this problem to some degree. Design changes have included reducing the diameter of the lenses in order to decrease the amount of corneal area covered by the impermeable material and shaping the back surface of the PMMA contact lens to provide for pumping action and concomitant tear flow under the lens, the tears containing dissolved oxygen from the air.

While such designs have made possible the wearing of contact lenses, significant problems and limitations remain, both because of the inadequacy of oxygen supply to the cornea and because the designs may produce discomfort and undesirable physiological symptoms to the wearer, frequently to a degree which makes wearing of the contact lens possible for only short periods of time or not at all.

Continued oxygen deprivation of the cornea results in edema or swelling of the cornea which may result in corneal damage. In addition, while oxygen must be supplied to the cornea for its metabolic processes, carbon dioxide, a waste product of these processes must be removed. The same principles apply for providing a route for removal of carbon dioxide from the cornea as for the transport of oxygen to the cornea, when a contact lens covers the cornea.

In view of the fact that the lacrimal fluid ("tears") supplies some dissolved oxygen to the epithelium of the cornea, it was hoped that "soft" lenses would solve this problem. Researchers experimented with lenses made of hydrophilic polymers, mainly comprising polyhydroxyethyl methacrylate (known in the art as "HEMA"). These hydrogel soft lenses are an improvement over the hard lenses but the materials themselves are not gas permeable. However, these materials absorb water and swell until equilibrium is attained and therefore possess a high degree of hydration which is directly related to the mode of oxygen transport. The highly hydrated lenses are able to obtain satisfactory oxygen transport levels but suffer from several resulting problems. First, since the soft lenses are used in the swollen state, the molecular materials of their composition are markedly reduced in mechanical strength and are extremely fragile. Due to this fragileness, the thickness of the lens must be increased and therefore these prior art soft lenses are ill-suited for the preparation of ultra-thin corneal lenses. By increasing the thickness of the lens, the gas permeability of the lens is thereby decreased forming a vicious cycle between gas permeability and strength.

In making an ultra-thin lens, the greater the strength and the greater the refractive index of the material used, the better the resulting thin lens.

A second problem associated with the prior art soft lenses is that since they are always worn in the wet and swollen state, they are easily contaminated with bacteria. Therefore, they need to be sterilized once a day by boiling. This boiling treatment is not only troublesome, but often causes decomposition and breakdown of the lens material. Thus, the prior art soft lenses are very short lived.

The present invention overcomes the problems of the prior art contact lens materials by providing a contact lens material that is relatively "hard", comfortable to wear due to its enhanced surface wettability, and gas permeable.

SUMMARY OF THE INVENTION

Broadly stated, the present invention is a contact lens material prepared by copolymerizing a reaction mixture comprising: (1) a styrene component (which by definition has a reactive vinyl group); (2) a vinyl alcohol ester component with a reactive vinyl group; (3) a polyethyleneglycol mono-ester component with a reactive vinyl or substituted vinyl group; (4) a substituted polysiloxane or substituted silane component bearing a substituent group that is reactive with the vinyl groups of the styrene component and the vinyl alcohol ester component. Optionally, the reaction mixture may comprise (5) a cross-linking component bearing at least two groups that are reactive with the vinyl groups of the aromatic component and the ester component.

In more specific terms, the contact lens material of the present invention is prepared by copolymerizing a mixture of:

(1) a styrene component such as styrene, a ring substituted styrene such as alpha-methyl styrene or vinyltoluene, and mixtures thereof; and (2) a vinyl alcohol ester component such as vinyl acetate, or other vinyl alcohol esters prepared by the addition of (i) straight-chain, branched-chain, or aromatic carboxylic acids with up to about 10 carbon atoms to (ii) acetylene or a substituted alkyne of up to about 10 carbon atoms, and mixtures thereof; and (3) a polyethylene glycol ester component such as pentaethyleneglycol monomethacrylate, or other polyethylene glycol ester having from 2 through 10 PEG units ($CH_2CH_2O$) monoesterified with a carboxylic acid having at least one vinyl or substituted vinyl group such as acrylic or methacrylic acid, and mixtures thereof; and (4) a substituted polysiloxane or substituted silane component such as methyl polysiloxane, dimethyl polysiloxane, ethyl polysiloxane, phenyl polysiloxane, methoxy polysiloxane, vinyl polysiloxane, fluoropropyl polysiloxane, cyano polysiloxane, dimethylphenylmethyl polysiloxane, a methyl substituted silane, a dimethyl substituted silane, an ethyl substituted silane, a phenyl substituted silane, a methoxy substituted silane, a vinyl substituted silane, a fluoropropyl substituted silane, a cyano substituted silane, a dimethylphenylmethyl substituted silane, and mixtures thereof.

Optionally, the mixture to be copolymerized may include:

(5) a cross-linking component such as divinyl benzene, ethylene dimethacrylate, allyl methacrylate, other substituted acrylates and methacrylates, and mixtures thereof.

The preferred polysiloxanes used in the present invention have high molecular weights (in the range of about 10,000 to about 20,000 molecular weight units) and corresponding viscosity of about 100 to about 500 centipoise. The methylphenyl polysiloxanes have viscosities from about 100 to about 150 centipoise. The dimethyl polysiloxane has a viscosity of about 500 centipoise. The dimethylphenylmethyl polysiloxane used was purchased from Polysciences, Inc. Generally speaking, polysiloxanes have molecular weights of up to about 150,000 molecular weight units and viscosities of up to about 2 million centipoise. Once this approximate molecular weight-viscosity limit is exceeded, the compounds are considered rubbers. When silanes are used, polysiloxane units can be formed during the copolymerization.

The preferred styrene component is styrene. The preferred vinyl alcohol ester component is vinyl acetate. The preferred polyethyleneglycol ester is pentaethyleneglycol monomethacrylate. The preferred substituted polysiloxanes or substituted silane components are dimethylphenylmethyl polysiloxane and dimethylpolysiloxane.

Preferably the reaction mixture includes a cross-linking component. The preferred cross-linking component is divinyl benzene.

The polymerization is carried out by using a conventional initiator, such as conventional peroxy and azo compounds. Such known polymerization initiators are set forth in the Encyclopedia of Polymer Science and Technology.

A typical copolymerization mixture includes (by weight):
 about 40–97% of the styrene component;
 about 1–20% of the vinyl alcohol ester component;
 about 1–20% of the polyethylene glycol ester component;
 about 1–20% of the substituted polysiloxane or substituted silane component;
 about 0–10% of the cross-linking component;
 about 0–1.0% initiator; and
 about 0–1.0% colorant.

A preferred copolymerization mixture includes (by weight):
 about 55–85% of the styrene component;
 about 1–15% of the vinyl alcohol ester component;
 about 1–10% of the polyethylene glycol ester component;
 about 5–10% of the substituted polysiloxane or substituted silane component;
 about 5–10% of the cross-linking component;
 about 0–1.0% initiator; and
 about 0–1.0% colorant.

A more preferred copolymerization mixture includes (by weight):
 about 60–80% of the styrene component;
 about 2–10% of the vinyl alcohol ester component;
 about 1–10% of the polyethlene glycol component;
 about 5–10% of the substituted polysiloxane or substituted silane component;
 about 10% of the cross-linking component;
 about 0–1.0% initiator; and
 about 0–1.0% colorant.

Typical reaction conditions for the copolymerization include use of a closed reaction container held within a temperature range between 35° and 60° C. for 2–20 days. Preferably, the reaction takes place in a closed reaction container that is transparent to ultraviolet radiation, at a temperature of between 35° and 60° C., in the presence of 350 nanometer ultraviolet radiation, for 2–8 days. In the examples, a Rayonet RPR 100 reactor with 24 watts of "black light," 90% of which is at 350 nm., was used.

The reaction product is an improved contact lens material that is gas permeable. Typical oxygen permeability (Dk) values of the product measured at 21° C. were at least $4 \times 10^{-11}$ ($cm^2$/sec) (ml $O_2$/ml mm Hg). Typical refractive index values are about 1.50 to about 1.60, and wettability values are surface wetting angles of less than 40 degrees after a 24 hour soak state. The reaction product is wettable and can be cast, molded or machined. The new contact lens material is transparent, dimensionally stable, and can be used in the manufacture of "hard" contact lenses to correct myopia, hyperopia, corneal astigmatism, and presbyopia. Contact lenses made of the reaction product can be manufactured with various surface designs, such as cylindrical, toric, bi-toric, bifocal and aspheric. The new contact lens material of the present invention has a high index of refraction and its physicochemical properties meet the criteria set forth for conventional hard contact lenses (A.N.S.I.,Z-80.6-1976, as amended).

DETAILED DESCRIPTION OF THE INVENTION

The following Examples are illustrative only and are not intended to show the limits of the scope of the invention. All "parts" are by weight unless otherwise noted.

EXAMPLE 1

A reaction mixture comprising:
70 parts styrene
10 parts divinyl benzene
10 parts dimethylpolysiloxane
10 parts vinyl acetate
was placed in a container that is transparent to ultraviolet radiation. The container was sealed and maintained within a temperature range between 35° and 60° C. in the presence of 350 nm ultraviolet radiation for 8 days.

EXAMPLE 2

A reaction mixture comprising:
74 parts styrene
10 parts divinyl benzene
8 parts dimethylphenylmethyl polysiloxane
8 parts vinyl acetate
was placed in a container that is transparent to ultraviolet radiation. The container was sealed and maintained within a temperature range between 35° and 60° C. in the presence of 350 nm ultraviolet radiation for 4 days.

EXAMPLE 3

A reaction mixture comprising:
80 parts styrene
10 parts divinyl benzene
5 parts dimethylphenylmethyl polysiloxane
5 parts vinyl acetate
0.2 parts azobisisobutyronitrile
was placed in a container that is transparent to ultraviolet radiation. The container was sealed and maintained within a temperature range between 35° and 60° C. in the presence of 350 nm ultraviolet radiation for 4 days.

EXAMPLE 4

A reaction mixture comprising:
80 parts styrene
10 parts divinyl benzene
5 parts dimethylphenylmethyl polysiloxane
5 parts polyethleneglycol monomethacrylate
0.1 parts azobisisobutyronitrile
was placed in a container that is transparent to ultraviolet radiation. The container was sealed and maintained within a range of temperature between 35° and 60° C. using fan ventilation in the presence of 350 nanometer ultraviolet radiation for 2 days.

EXAMPLE 5

A reaction mixture comprising:
75 parts styrene
10 parts divinyl benzene
5 parts dimethylphenylmethyl polysiloxane
5 parts vinyl acetate
5 parts pentaethyleneglycol monomethacrylate
0.1 parts azobisisobutyronitrile
was placed in a container that is transparent to ultraviolet radiation. The container was sealed and maintained within a temperature range between 35° and 60° C. using fan ventilation for cooling in the presence of 350 nanometer ultraviolet radiation for 2 days.

The reaction products of Examples 1-5 are all gas permeable materials suitable for use as a "hard" contact lens material. Dk values measured at 21° C. are at least $4 \times 10^{-11}$ (cm$^2$/sec) (ml O$_2$/ml mm Hg) or greater. Refractive index values are on the order of 1.50-1.60. Surface wetting angle values are less than 40 degrees after a 24 hour soak state. They exhibit physical properties similar to those of polymethylmethacrylate lens materials, but have good wettability, a higher refractive index, and oxygen permeability.

The best composition was obtained in Example 5. The Dk values measured at 21° C. are at least $4 \times 10^{-11}$ (cm$^2$/sec) (ml O$_2$/ml mm Hg) or greater. The refractive index is 1.57, plus or minus 0.01, and the surface wetting angle values are 30-40 degrees after a 24 hour soak state.

Examples 2 and 4 produced acceptable lens materials, as discussed above. As is obvious, the reaction mixture of Example 2 lacks a polyethylene glycol ester component, and the reaction mixture of Example 4 lacks a vinyl alcohol ester component. Thus, the present invention also includes contact lens compositions prepared by the process of copolymerizing a reaction mixture comprising (A) components (1), (3), (4) and, optionally, (5); and (B) components (1), (2), (4) and, optionally, (5); where those components are as defined in the Summary of the Invention.

It is noted that the foregoing reactions were also carried out in the presence of shorter wavelength ultraviolet radiation and in the absence of ultraviolet radiation but the reaction times were unsatisfactory being either too short with considerable bubble formation or inordinately long.

I claim:

1. A copolymer prepared by copolymerizing a reaction mixture comprising:
   (1) about 40-97% by weight of a styrene component selected from styrene, a ring substituted styrene such as alphamethyl styrene or vinyltoluene, and mixtures thereof; and
   (2) about 1-20% by weight of a vinyl alcohol ester component selected from vinyl acetate, vinyl alcohol esters prepared by addition of either aliphatic or aromatic carboxylic acids having from 1 to about 10 carbon atoms to acetylene or substituted alkynes, and mixtures thereof; and
   (3) about 1-20% by weight of a polyethylene glycol ester component selected from pentaethyleneglycol monomethacrylate, polyethylene glycol esters having from 2 through 10 PEG units (CH$_2$CH$_2$O) monoesterified with a carboxylic acid having at least one vinyl or substituted vinyl group such as acrylic or methacrylic acid, and mixtures thereof; and
   (4) about 1-20% by weight of a substituted polysiloxane or substituted silane component selected from methyl polysiloxane, dimethyl polysiloxane, ethyl polysiloxane, phenyl polysiloxane, methoxy polysiloxane, vinyl polysiloxane, fluoropropyl polysiloxane, cyano polysiloxane, dimethylphenylmethyl polysiloxane, a methyl substituted silane, a dimethyl substituted silane, an ethyl substituted silane, a phenyl substituted silane, a methoxy substituted silane, a vinyl substituted silane, a fluoropropyl substituted silane, a cyano substituted silane, a dimethylphenylmethyl substituted silane, and mixtures thereof.

2. The copolymer as defined by claim 1, wherein said reaction mixture further comprises:
   about 0-10% by weight of a cross-linking component selected from divinyl benzene, ethylene dimethacrylate, allyl methacrylate, other substituted acrylates and methacrylates, and mixtures thereof.

3. The copolymer as defined by claim 1, wherein the styrene component of said reaction mixture is styrene.

4. The copolymer as defined by claim 2, wherein the styrene of said reaction mixture component is styrene, and the cross-linking component of said reaction mixture is divinyl benzene.

5. The copolymer as defined by claim 4, wherein the vinyl alcohol ester component of said reaction mixture is vinyl acetate.

6. The copolymer as defined by claim 5, wherein the polyethylene glycol ester component of said reaction mixture is pentaethyleneglycol monomethacrylate.

7. The copolymer as defined by claim 6, wherein the substituted polysiloxane or substituted silane component of said reaction mixture is dimethyl polysiloxane.

8. The copolymer as defined by claim 6, wherein the substituted polysiloxane or substituted silane component of said reaction mixture is dimethylphenylmethyl polysiloxane.

9. The copolymer as defined by claim 8, wherein said reaction mixture further comprises azobisisobutyronitrile.

10. The copolymer as defined by claim 2, wherein the components of said reaction mixture are present in the following amounts by weight:
    about 55-85% of said styrene component;
    about 1-15% of said vinyl alcohol ester component;
    about 1-10% of said polyethylene glycol ester component;
    about 5-10% of said substituted polysiloxane or substituted silane component;
    about 5-10% of said cross-linking component.

11. The copolymer as defined by claim 2, wherein the components of said reaction mixture are present in the following amounts by weight:
    about 60-80% of said styrene component;
    about 2-10% of said vinyl alcohol ester component;
    about 1-10% of said polyethylene glycol component;
    about 5-10% of said substituted polysiloxane or substituted silane component;
    about 10% of said cross-linking component.

12. The copolymer as defined by claim 2, wherein said copolymer comprises about:
    75 parts styrene,
    10 parts divinyl benzene,
    5 parts dimethylphenylmethyl polysiloxane,
    5 parts vinyl acetate,
    5 parts pentaethyleneglycol monomethacrylate, and
    0.1 parts azobisisobutyronitrile
    wherein said parts are parts by weight.

13. A copolymer prepared by copolymerizing a reaction mixture comprising:
    (1) about 40-97% by weight of a styrene component selected from styrene, a ring substituted styrene such as alphamethyl styrene or vinyltoluene, and mixtures thereof; and
    (2) about 1-20% by weight of a vinyl alcohol ester component selected from vinyl acetate, vinyl alcohol esters prepared by addition of either aliphatic or aromatic carboxylic acids having from 1 to about 10 carbon atoms to acetylene or substituted alkynes, and mixtures thereof; and
    (3) about 1-20% by weight of a substituted polysiloxane or substituted silane component selected from methyl polysiloxane, dimethyl polysiloxane, ethyl polysiloxane, phenyl polysiloxane, methoxy polysiloxane, vinyl polysiloxane, fluoropropyl polysiloxane, cyano polysiloxane, dimethylphenylmethyl polysiloxane, a methyl substituted silane, a dimethyl substituted silane, an ethyl substituted silane, a phenyl substituted silane, a methoxy substituted silane, a vinyl substituted silane, a fluoropropyl substituted silane, a cyano substituted silane, a dimethylphenylmethyl substituted silane, and mixtures thereof.

14. The copolymer as defined by claim 13, wherein said reaction mixture further comprises:
    about 5-10% by weight of a cross-linking component selected from divinyl benzene, ethylene dimethacrylate, allyl methacrylate, or substituted acrylates and methacrylates, and mixtures thereof.

15. The copolymer as defined by claim 14, wherein said reaction mixture comprises:
    74 parts styrene
    10 parts divinyl benzene
    8 parts dimethylphenylmethyl polysiloxane
    8 parts vinyl acetate
    wherein said parts are parts by weight.

16. A copolymer prepared by copolymerizing a reaction mixture comprising:
    (1) about 40-97% by weight of a styrene component selected from styrene, a ring substituted styrene such as alphamethyl styrene or vinyltoluene, and mixtures thereof; and
    (2) about 1-20% by weight of a polyethylene glycol ester component selected from pentaethyleneglycol monomethacrylate, polyethylene glycol esters having from 2 through 10 PEG units ($CH_2CH_2O$) monoesterified with a carboxylic acid having at least one vinyl or substituted vinyl group such as acrylic or methacrylic acid, and mixtures thereof; and
    (3) about 1-20% by weight of a substituted polysiloxane or substituted silane component selected from methyl polysiloxane, dimethyl polysiloxane, ethyl polysiloxane, phenyl polysiloxane, methoxy polysiloxane, vinyl polysiloxane, fluoropropyl polysiloxane, cyano polysiloxane, dimethylphenylmethyl polysiloxane, a methyl substituted silane, a dimethyl substituted silane, an ethyl substituted silane, a phenyl substituted silane, a methoxy substituted silane, a vinyl substituted silane, a fluoropropyl substituted silane, a cyano substituted silane, a dimethylphenylmethyl substituted silane, and mixtures thereof.

17. The copolymer as defined by claim 16, wherein said reaction mixture further comprises:
    about 5-10% by weight of a cross-linking component selected from divinyl benzene, ethylene dimethacrylate, allyl methacrylate, other substituted acrylates and methacrylates, and mixtures thereof.

18. The copolymer as defined by claim 17, wherein said reaction mixture comprises:
- 80 parts styrene
- 10 parts divinyl benzene
- 5 parts dimethylphenylmethyl polysiloxane
- 5 parts polyethyleneglycol monomethacrylate
- 0.1 parts azobisisobutyronitrile wherein said parts are parts by weight.

19. A contact lens comprising the copolymer as defined by any one of claims 1–9, 10–12 or 13–18.

* * * * *